Figure 1:
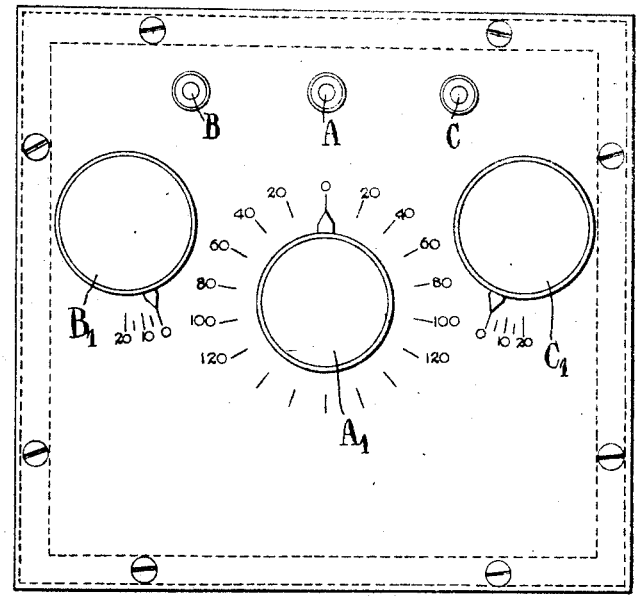

Dec. 14, 1926.                                                1,610,258
A. E. CHAPMAN
ELECTRICAL VARIABLE CONDENSER
Filed June 4, 1923          2 Sheets-Sheet 1

Inventor
A. E. Chapman
By Marks Clerk
Attys.

Dec. 14, 1926.  1,610,258
A. E. CHAPMAN
ELECTRICAL VARIABLE CONDENSER
Filed June 4, 1923  2 Sheets-Sheet 2

Inventor
A. E. Chapman
By Marks Clerk
Attys.

Patented Dec. 14, 1926.

1,610,258

UNITED STATES PATENT OFFICE.

ALBERT EDWARD CHAPMAN, OF LONDON, ENGLAND.

ELECTRICAL VARIABLE CONDENSER.

Application filed June 4, 1923, Serial No. 643,289, and in Great Britain June 27, 1922.

This invention relates to electrical variable condensers, more particularly for use in high frequency circuits.

The object of the invention is to provide a variable condenser capable of being connected to or of forming part of two or more interconnected circuits, for instance, the aerial circuit of a wireless station and a closed oscillatory circuit coupled therewith, in order to vary the capacities of the said circuits, or for any other purpose, such as for serving as a combined variable grid condenser and static reactance coupling etc.

It is known in electrical variable condensers to mount a group of plates in such a manner that it can be moved relatively to two groups of fixed plates so as to constitute two variable condensers capable of being inserted in two separate circuits and of being varied simultaneously. Such condensers, however, whilst allowing the simultaneous variation of the two capacities, do not allow the ratio of the two variable capacities to be adjusted to any desired value nor does it allow the one capacity to be varied whilst the other one is maintained at an adjusted definite value. These disadvantages are removed by the arrangement according to the present invention.

The invention consists in a variable condenser which is constituted by at least three groups of plates, at least two of which are movable relatively to the other group or groups and independently of one another. The groups of plates are provided with their own electrical terminals by which the condenser is inserted in at least two circuits.

The condenser according to the invention, which may be referred to as a "multiple variable condenser" may be constructed as an air condenser or with any other dielectric.

I will now describe, with reference to the accompanying drawings and by way of example, a form of construction which can advantageously be used both in series with the aerial tuning inductance and in parallel therewith without it being necessary to effect any change in the outside connections.

Referring to the drawings:—

Figure 1 is a plan view of the improved condenser.

Figure 2:
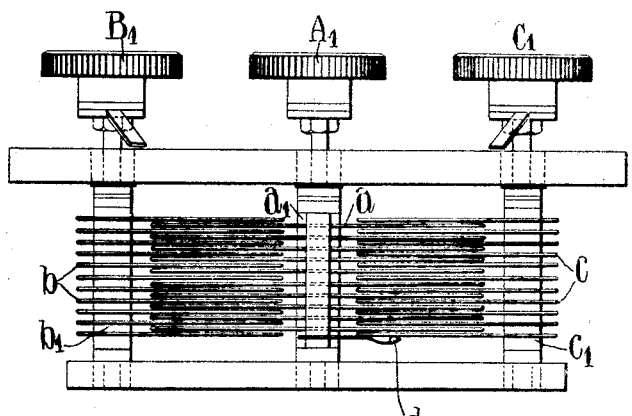

Figure 2 a sectional elevation thereof, and

Figure 3:
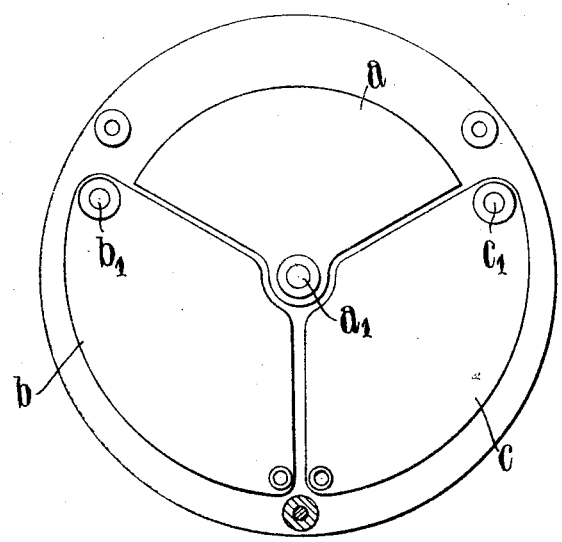
Figure 4:
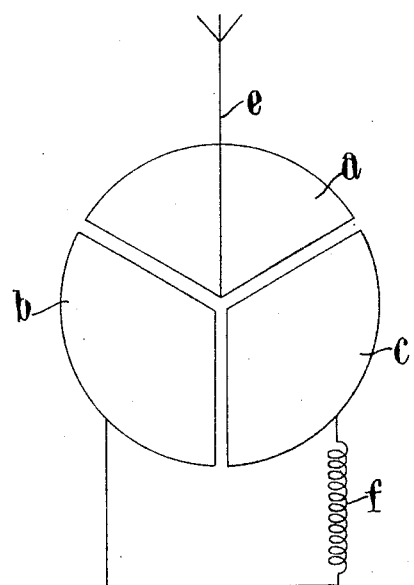

Figure 3 a sectional plan, whilst Figure 4 is a diagram of connections.

Three movable groups of sector-shaped plates, $a$, $b$, and $c$, each covering an angle of about 120°, are assembled around a common axis, each group being mounted on a spindle viz:—$a_1$, $b_1$ and $c_1$ respectively provided with an operating knob $A_1$, $B_1$, $C_1$ by which the plates of each group can be turned between the plates of the other groups. Each one of these groups is electrically connected to a terminal A, B and C respectively and the spindle of the group $a$ carries a spring-contact arm or the like $d$ adapted to make contact, when the group $a$ reaches a certain point during its movement, with one of the plates of the groups $c$ with which it constitutes a series condenser and to maintain such short-circuiting connection of the series condenser during the time the group $a$ is used as a parallel condenser with respect to the other group $b$. Preferably the group $a$ is moved through an angle of about 10 degrees after maximum series capacity is reached before the short-circuit referred to takes place.

Assuming the terminal of the group $c$, used as a constituent part of the series condenser, to be connected to the aerial $e$ (see Figure 4) the terminal of the group $a$ to the one end of the inductance $f$ and the terminal of the group $b$, used as a constituent part of the parallel condenser, to the other end of the inductance, which is also connected to earth, it will be seen that starting with a minimum series capacity, such capacity is increased up to a certain maximum and as soon as the plates of the group $a$ start to come between the plates $b$ with which they constitute the parallel condenser the series condenser is short-circuited, and the parallel capacity is gradually increased.

Instead of making the three groups of such size that they shall each cover approximately 120°, they may be made of any other required relative sizes. Thus, for instance, the group $a$ may extend over an angle of 180°, the group $c$ of the series capacity over a small angle giving a maximum capacity equal to that of the aerial circuit when such capacity is not inserted in the circuit and the group $b$ of the parallel capacity over an angle equal to 180° minus the angle corresponding to the series capacity. Such a construction will permit the series condenser to be used for tuning only to wave lengths shorter than that corresponding to the natural frequency of the aerial circuit, and the parallel condenser to be used for tuning to the longer wave lengths, the series condenser being preferably left with its maximum capacity in the circuit, which maximum series capacity remains constant during the variation of the parallel capacity.

According to a modification, one or two of the groups may be made fixed, but the construction in which all the three groups are made movable, is preferred as the flexibility of the multiple condenser thus obtained is greatly increased, the values of the individual capacities as well as their relative values being in that case capable of being varied to any desired extent.

I wish it to be understood that the invention is not limited to the forms of construction hereinbefore given by way of example, as the same may be modified in various respects without in any way departing from the spirit of the invention. Further, the invention is not limited to a condenser of the circular type, as the essence thereof may be embodied in condensers of other forms, such as that of the longitudinally sliding type, and several condensers constructed according to the invention may be mechanically connected together, for instance through the spindle or otherwise, in order that they may be operated simultaneously as may be required for various purposes.

What I claim is:—

1. A multiple variable condenser having more than two groups of plates, means pivotally mounting the several groups of plates, means on at least two of the said groups for moving each one of them independently from one another relatively to the other groups and an electrical terminal on each group whereby the condenser is rendered capable of being inserted in at least two circuits which are thereby capable of being controlled independently of one another, as set forth.

2. A multiple variable condenser having three groups of plates, means pivotally mounting the several groups of plates, means on two of the said groups for moving them relatively and independently of one another to the other group and an electrical terminal on each group whereby the condenser is rendered capable of being inserted in two circuits which are thus capable of being controlled independently of one another.

3. A multiple variable condenser having more than two groups of plates, means on at least two of the said groups for moving them relatively to the other groups, means carried by one group of plates and engageable with another group for short-circuiting the two groups of plates, and an electrical terminal on each group, whereby the condenser is rendered capable of being inserted in at least two circuits, as set forth.

4. In a multiple variable condenser, a support, two groups of plates, means pivotally mounting the groups of plates at spaced points on the support, a third group of plates, and means pivotally mounting said third group of plates on the support at a point intermediate the pivotal axes of the first mentioned group of plates.

5. In a multiple variable condenser, a support, two groups of plates, means pivotally mounting the groups of plates at spaced points on the support, a third group of plates, and means pivotally mounting said third group of plates on the support at a point intermediate the pivotal axes of the first mentioned group of plates, and means carried by the third group of plates engageable with one of the first mentioned groups for short-circuiting said groups.

In testimony whereof I have signed my name to this specification.

ALBERT EDWARD CHAPMAN.